United States Patent
Kumar et al.

(10) Patent No.: US 10,631,199 B2
(45) Date of Patent: *Apr. 21, 2020

(54) METHOD FOR ALLOWING USER EQUIPMENT TO DETACH FROM NETWORK ENTITY

(71) Applicant: Samsung Electronics Co., Ltd., Suwon-si, Gyeonggi-do (KR)

(72) Inventors: Lalith Kumar, Bangalore (IN); Jayashankara Dalagowdanahalli Malleshappa, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/277,401

(22) Filed: Feb. 15, 2019

(65) Prior Publication Data

US 2019/0182706 A1  Jun. 13, 2019

Related U.S. Application Data

(63) Continuation of application No. 15/089,965, filed on Apr. 4, 2016, now Pat. No. 10,237,780.

(30) Foreign Application Priority Data

Apr. 2, 2015 (IN) ............................ 1772/CHE/2015
Mar. 4, 2016 (IN) ............................ 1772/CHE/2015

(51) Int. Cl.
  *H04W 28/02* (2009.01)
  *H04W 60/06* (2009.01)
  *H04L 29/12* (2006.01)
  *H04W 8/06* (2009.01)

(52) U.S. Cl.
  CPC ..... *H04W 28/0289* (2013.01); *H04L 61/6054* (2013.01); *H04W 60/06* (2013.01); *H04W 8/06* (2013.01)

(58) Field of Classification Search
  CPC .............. H04W 28/0289; H04W 60/06; H04L 61/6054
  See application file for complete search history.

(56) References Cited

U.S. PATENT DOCUMENTS

| 8,000,332 B2 | 8/2011 | Yi |
| 2012/0115492 A1 | 5/2012 | Liao |
| 2014/0003348 A1 | 1/2014 | Velev et al. |

(Continued)

FOREIGN PATENT DOCUMENTS

WO   2014/067313 A1   5/2014

OTHER PUBLICATIONS

New Postcom; Clarifications on MS-initiated detach procedure when MM back-off timer is running; 3GPP TSG CT WG1 Meeting #75; C1-114586; Nov. 14-18, 2011; San Francisco, CA.

(Continued)

*Primary Examiner* — Jackie Zuniga Abad
(74) *Attorney, Agent, or Firm* — Jefferson IP Law, LLP

(57) ABSTRACT

A method for allowing a user equipment (UE) to detach from a network entity is provided. The method includes detecting that the UE is not registered with the network entity while the UE is in an area previously registered with the network entity. Further, the method includes sending a detach indication to the network entity to detach a service to the UE.

15 Claims, 9 Drawing Sheets

(56) References Cited

U.S. PATENT DOCUMENTS

2015/0271775 A1    9/2015   Wu

OTHER PUBLICATIONS

3GPP; 3rd Generation Partnership Project; Technical Specification Group Core Network and Terminals; Mobile radio interface Layer 3 specification; Core network protocols; Stage 3 (Release 13); 3GPP TS 24.008 V13.1.0 (Mar. 2015); Technical Specification; Mar. 2015; France.

ETSI TS 124 008 V8.6.0 (Jul. 2009) Techinical Specification Digital cellular telecommunication system (Phase 2+); Universal Mobile Telecommunications System (UMTS); LTE; Mobile radio interface Layer 3 specification; Core network protocols; Stage 3 (3GPP TS 24.008 version 8.6.0 Release 8).

Indian Office Action dated Nov. 29, 2019, issued in a counterpart Indian Application No. 1772/CHE/2015.

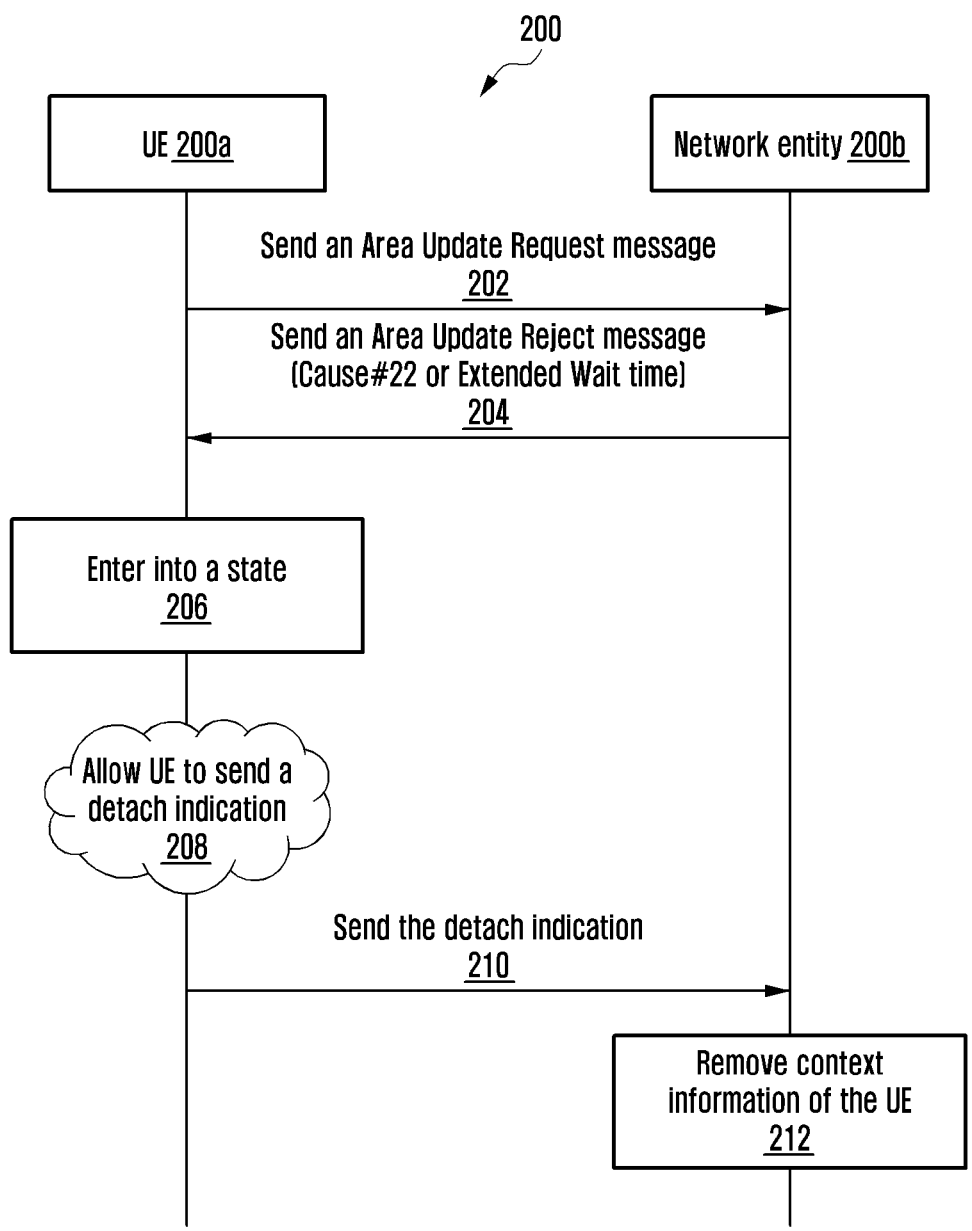

METHOD FOR ALLOWING USER EQUIPMENT TO DETACH FROM NETWORK ENTITY

CROSS-REFERENCE TO RELATED APPLICATION(S)

This application is a continuation application of prior application Ser. No. 15/089,965, filed on Apr. 4, 2016, which claimed the benefit under 35 U.S.C. 119(a) of an Indian Provisional Patent application filed on Apr. 2, 2015 in the Indian Intellectual Property office and assigned Serial No. 1772/CHE/2015, and of an Indian Non-provisional patent application filed on Mar. 4, 2016 in the Indian Intellectual Property office and assigned Serial No. 1772/CHE/2015, the entire disclosure of each of which is hereby incorporated by reference.

TECHNICAL FIELD

The present disclosure relates to wireless communications systems. More particularly, the present disclosure relates to a mechanism for allowing a user equipment (UE) to detach from a network entity.

BACKGROUND

As technology in wireless communication advances towards efficient band utilization (i.e., global system for mobile communication (GSM), universal mobile telecommunications system (UMTS) or long term evolution (LTE)), a network burden increases. As such, there is a continuous need for reducing congestion at the network. Further, managing many user equipment's (UEs) efficiently is very important from a telecommunication system's perspective as it effects the entire network. As per current implementation, there are cases where network congestion cases are not handled.

FIG. 1A shows a sequence diagram illustrating a method according to the related art.

Referring to FIG. 1A, a scenario is illustrated in which a UE 100a sends an area update request message to a network entity 100b to perform an area update procedure (such as a location area update (LAU) procedure, a routing area update (RAU) procedure, or a tracking area update (TAU) procedure) in operation 102. After receiving the area update request message, the network entity 100b sends an area update reject message to the UE 100a due to congestion or lower layer (Extended wait time) indication of the congestion in operation 104. The UE 100a, after receiving the area update reject message, initiates a Timer (i.e., T3246) and enters an Attempting to Update State with a mobility management entity (MME) in operation 106. Further, the UE 100a assumes that it is not registered with the network entity 100b and there is no context information of the UE 100a at the network entity 100b, whereas the network entity 100b will be maintaining the context information of the UE 100a in operation 108. Thus, whenever the UE 100a needs to detach, it will detach locally and will not inform the network entity 100b as the detach indication is blocked in operation 110. Further, the UE's context (such as an area in which the UE is located, a temporary identifier of the UE, etc.) is maintained at the network entity 100b and page the UE 100a for any mobile terminated (MT) operation. Finally, in operation 112, the Timer expires.

FIG. 1B shows another sequence diagram illustrating another method according to the related art.

Referring to FIG. 1B, a scenario is illustrated in which a UE 100a sends an area update request message to a network entity 100b to perform an area update procedure in operation 120. After receiving the update request message, the network entity 100b sends the area update reject message to the UE 100a due to congestion or lower layer (Extended wait time) indication of the congestion in operation 122. The UE 100a, after receiving the area update reject message, initiates a Timer (i.e., T3246) and enters an Attempting to Update State with an MME of the UE 100a in operation 124. Further, the UE's context is maintained at the network entity 100b in operation 126. Due to the congestion, the network entity 100b will not provide any service to the UE 100a so that a detach indication is blocked in operation 128. In this case, the network entity 100b continues to maintain the UE's context even though the UE 100a is locally detached in operation 130. Hence, if any MT call is received for the UE 100a, the network entity 100b would repeatedly page the UE 100a in operation 132, thus leading to a waste of paging resources of the congested network entity. Finally, in operation 134, the Timer expires.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a mechanism for allowing a user equipment (UE) to detach from a network entity.

Another aspect of the present disclosure is to provide a mechanism for detecting that the UE is not registered with the network entity, while the UE is in an area previously registered with the network entity.

Another aspect of the present disclosure is to provide a mechanism for sending a detach indication to the network entity to detach the service to the UE.

Another aspect of the present disclosure is to provide a mechanism for detecting that a first timer (e.g., T3246) is running at the UE and the UE is in one of an ATTEMPTING TO UPDATE state, a Mobility Management IDLE state, and a LIMITED SERVICE state.

Another aspect of the present disclosure is to provide a mechanism for sending a detach indication to the network entity to detach a service to the UE.

Yet another aspect of the present disclosure is to provide a mechanism for maintaining, by the network entity, context information of the UE.

Yet another aspect of the present disclosure is to provide a mechanism for receiving, at the network entity, the detach indication from the UE.

Yet another aspect of the present disclosure is to provide a mechanism for removing, at the network entity, the context information to detach the service to the UE.

In accordance with an aspect of the present disclosure, a method for allowing a UE to detach from a network entity is provided. The method includes detecting that the UE is not registered with the network entity while the UE is in an area previously registered with the network entity, and sending a detach indication to the network entity to detach a service to the UE.

In accordance with an aspect of the present disclosure, a method for allowing a UE to detach from a network entity is provided. The method includes detecting that a first timer (e.g., T3246) is running at the UE and the UE is in one of an ATTEMPTING TO UPDATE state, a Mobility Management IDLE state, and a LIMITED SERVICE state, and sending a detach indication to the network entity to detach a service to the UE.

In accordance with an aspect of the present disclosure, a method for allowing a UE to detach from a network entity is provided. The method includes maintaining, by the network entity, context information of the UE, receiving, at the network entity, a detach indication from the UE, and removing, at the network entity, the context information to detach a service to the UE.

In accordance with an aspect of the present disclosure, a UE that is able to detach from a network entity is provided. The UE includes a controller configured to detect that the UE is not registered with the network entity while the UE is in an area previously registered with the network entity, and send a detach indication to the network entity to detach a service to the UE.

In accordance with an aspect of the present disclosure, a UE that is able to detach from a network entity is provided. The UE includes a controller configured to detect that a first timer (e.g., T3246) is running at the UE and the UE is in one of an ATTEMPTING TO UPDATE state, a Mobility Management IDLE state, and a LIMITED SERVICE state, and send a detach indication to the network entity to detach a service to the UE.

Various embodiments herein provide a network entity for detaching a UE. The network entity includes a controller configured to maintain context information of the UE, receive a detach indication from the UE, and remove the context information to detach a service to the UE.

Various embodiments herein provide a computer program product comprising computer executable program code recorded on a computer readable non-transitory storage medium. The computer executable program code when executed causing actions including detecting that a UE is not registered with a network entity while the UE is in an area previously registered with the network entity, and sending a detach indication to the network entity to detach a service to the UE.

Various embodiments herein provide a computer program product comprising computer executable program code recorded on a computer readable non-transitory storage medium. The computer executable program code when executed causing actions including detecting that a first timer (e.g., T3246) is running at a UE and the UE is in one of an ATTEMPTING TO UPDATE state, a Mobility Management IDLE state, and a LIMITED SERVICE state, and sending a detach indication to the network entity to detach a service to the UE.

Various embodiments herein provide a computer program product comprising computer executable program code recorded on a computer readable non-transitory storage medium. The computer executable program code when executed causing actions including maintaining, by a network entity, context information of a UE), receiving, at the network entity, a detach indication from the UE, and removing, at the network entity, the context information to detach a service to the UE.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The above and other aspects, features, and advantages of certain embodiments of the present disclosure will be more apparent from the following description taken in conjunction with the accompanying drawings, in which:

FIG. 2 shows a sequence diagram illustrating a method for allowing a user equipment (UE) to detach from a network entity, according to an embodiment of the present disclosure;

Throughout the drawings, like reference numerals will be understood to refer to like parts, components, and structures.

DETAILED DESCRIPTION

Figure 1A:
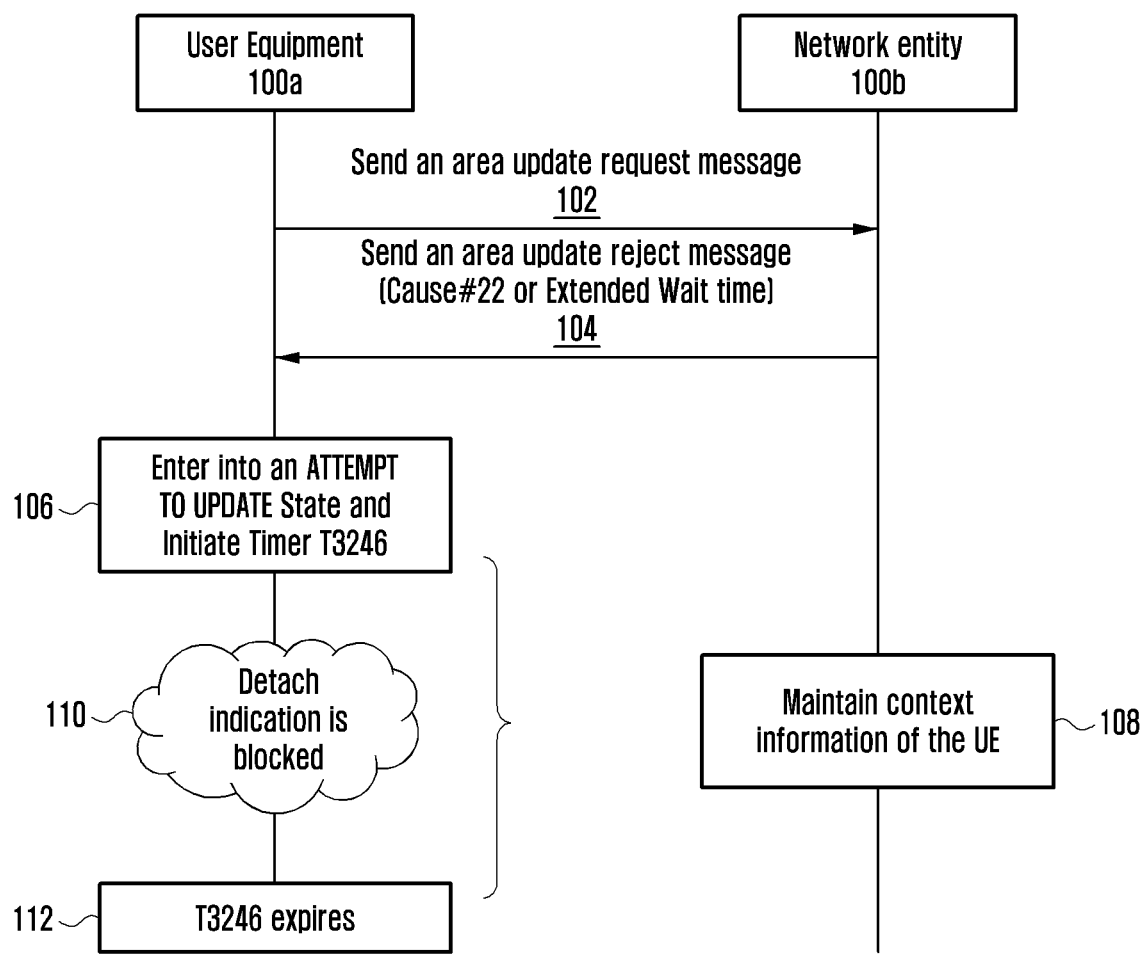
FIG. 1A shows a sequence diagram illustrating a method according to the related art.
Figure 1B:
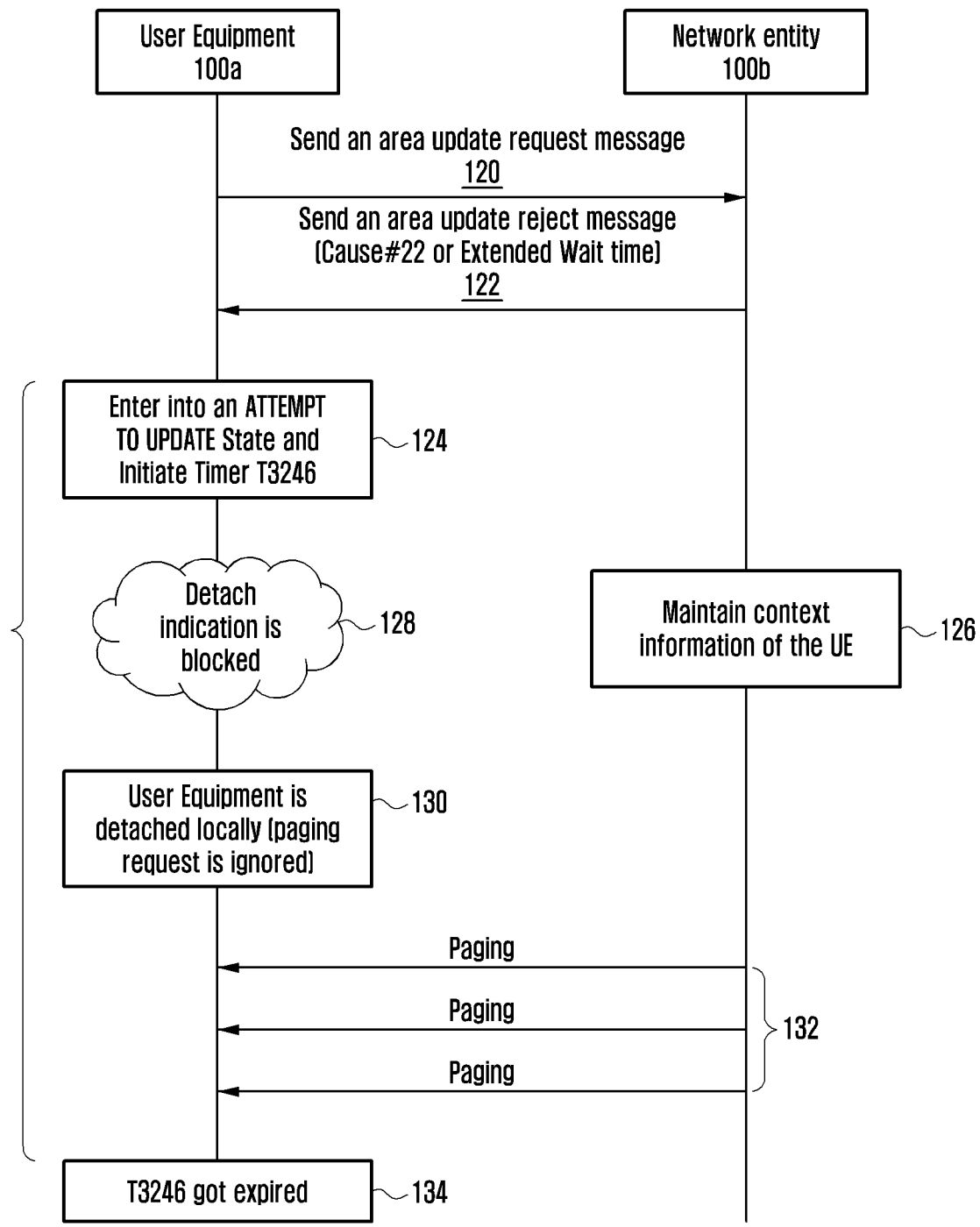
FIG. 1B shows another sequence diagram illustrating another method according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments described herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments described herein disclose a method for allowing a user equipment (UE) to detach from a network entity. The method includes detecting that the UE is not registered with the network entity, while the UE is in an area (LAI, RAI or TAI list as defined in 3rd Generation Partnership Project (3GPP) TS 24.008 or 24.301) previously registered with the network entity, and sending a detach indication to the network entity to detach a service to the UE.

In an embodiment of the present disclosure, the situation in which the UE is not registered with the network entity indicates that the UE is in one of an ATTEMPTING TO UPDATE state, and a LIMITED SERVICE state.

In an embodiment of the present disclosure, the detach indication to the network entity is sent when the UE detects at least one of a power off event, a power saving event, an Airplane Mode enablement event and any implementation dependent requirement.

In an embodiment of the present disclosure, the indication to the network entity is sent while a Timer is running at the UE in the ATTEMPTING TO UPDATE state.

Another embodiment of the present disclosure herein discloses a method for allowing the UE to detach from the network entity. The method includes detecting that a first timer (e.g., T3246) is running at the UE and the UE is in one of an ATTEMPTING TO UPDATE state, and a LIMITED SERVICE state, and sending the detach indication to the network entity to detach the service to the UE.

Another embodiment of the present disclosure herein discloses a method for allowing the UE to detach from the network entity. The method includes maintaining context information of the UE, receiving the detach indication from the UE, and removing the context information to detach the service to the UE.

In an embodiment of the present disclosure, the detach indication is received by the network entity when the UE is not registered with the network entity.

In the mechanisms of the related art, due to congestion at the network entity, the network entity is unable to provide one or more services to the UE. The UE is not allowed in the ATTEMPTING-TO-UPDATE state as per current implementation to send the detach indication for the service and remove the UEs context at the network entity.

Further, after receiving the area update reject message from the network entity, the UE assumes that it is not registered with the network entity and performs the local detach and power off, whereas the network entity will be maintaining the context information of the UE. As the network entity is maintaining the context information of many UEs, the database in the network entity will have many entries of UEs which are actually powered off. Thus, the database in the network entity gets congested. As the network entity is still maintaining the context information of the UE, if a mobile terminated (MT) call is received, the network entity would page the UE. However, because the UE is already switched off and thus will not respond to the paging, paging resources are wasted.

Unlike the systems and methods of the related art, a proposed method provides a mechanism for detaching the service to the UE. Further, in the proposed method, the UE is allowed to send the detach indication in the ATTEMPTING-TO-UPDATE state while the timer is running and the UE is in a registered area. Thus, reducing the congestion at the network entity by removing the context of the UE.

In a proposed method, the network entity is not allowed to maintain the context information of the UE when the UE has locally detached. Thus, helping in decongesting the congested network entity. Further, at the network entity, the UE is still registered, whenever the MT requests are received, the network entity will page the UE till a mobile reachability timer (MRT) and implicit detach timer gets expired.

Referring now to the drawings, and more particularly to FIGS. 2 through 8, where similar reference characters denote corresponding features consistently throughout the figures, there are shown preferred embodiments of the present disclosure.

FIG. 2 shows a sequence diagram illustrating a method for allowing a UE to detach from a network entity, according to an embodiment of the present disclosure.

Referring to FIG. 2, the sequence diagram 200 illustrates a sequence of operations between a UE 200a and a network entity 200b. In an embodiment, the UE 200a can be a laptop, a desktop computer, a mobile phone, a mobile station, a mobile terminal, a smart phone, personal digital assistants (PDAs), a tablet, a phablet, or any other electronic device.

In an embodiment of the present disclosure, in long term evolution (LTE), the network entity 200b can be a mobility management entity (MME). The MME is responsible for the delivery of data packets to the UE 200a back and forth within its geographical service area, including packet routing and transfer, mobility management (attach or detach and tracking area management), session management (packet data network (PDN) connection establishment or disconnection), logical link management, and authentication and charging functions. Further, the MME can also serve as a local mobility anchor for inter-working with other RATs (e.g. Global System for Mobile Communications (GSM) and universal mobile telecommunications system (UMTS)). In an embodiment, in UMTS, the network entity 200b can be a Serving GPRS support node (SGSN). The SGSN is responsible for the delivery of data packets to the UE 200a back and forth within its geographical service area, including packet routing and transfer, mobility management (attach/detach and tracking area management), session management (PDP Context establishment/disconnect), logical link management, and authentication and charging functions.

In another embodiment, in GSM, the network entity 200b can be a mobile switching center (MSC). The MSC is responsible for the delivery of voice service in circuit switch manner to the mobile devices back and forth within its geographical service area, including mobility management (attach/detach and location area management), logical link management, and authentication and charging functions.

At operation 202, the UE 200a sends an area update request message to the network entity 200b. In an embodiment of the present disclosure, the area update is a location area update (LAU) in case of the GSM network, a Routing Area Update (RAU) in case of the UNITS network, or a Tracking Area Update (TAU) in case of the LTE network.

At operation 204, after receiving the area update request message, the network entity 200b sends an area update reject message to the UE 200a due to congestion at the network entity 200b. Further, the network entity 200b maintains context information of the UE 200a. In an embodiment of the present disclosure, the context information can be the area in which the UE 200a is located, temporary identifiers of the UE 200a, or any other temporary information.

At operation 206, the UE 200a, after receiving the area update reject message, enters into a state. In an embodiment of the present disclosure, the state can be a mobility management (MM) IDLE state, an ATTEMPTING TO UPDATE state, or a LIMITED SERVICE state. In an embodiment as defined by the appended claims and their equivalents, if the UE 200a enters into the ATTEMPTING TO UPDATE state then, a first timer (e.g., "T3246") is initiated in a circuit switched (CS) domain. In another embodiment as defined by the appended claims and their equivalents, if the UE 200a enters into the ATTEMPTING TO UPDATE state then, a first timer (e.g., T3346) is initiated in a packet switched (PS) domain. In an embodiment as defined by the appended claims and their equivalents, the UE 200a can enter into the ATTEMPTING TO UPDATE state after trying to register (by sending the LAU, RAU, or TAU) with the network entity if the UE 200a faces an abnormal situation as defined in 3GPP TS 24.008. Further, when an attempt counter reaches 5, the UE 200a will enter into the ATTEMPTING TO UPDATE state.

At operation 208, the UE 200a is allowed to send a detach indication to the network entity 200b while the UE 200a is in the state. In an embodiment as defined by the appended claims and their equivalents, the detach indication is an international mobile subscriber identity (IMSI) detach indication. In an embodiment as defined by the appended claims and their equivalents situations in which the UE 200a may want to detach from the network entity 200b are described below:

When the user powers down the UE 200a
When it is necessary or desired to reduce power consumption of the UE 200a.
When the user turns on Airplane mode, etc.

At operation 210, the UE 200a sends the detach indication to the network entity 200b to detach a service to the UE 200a. The service can be, for example, a CS service or a PS service. In an embodiment as defined by the appended claims and their equivalents, the UE 200a sends the detach indication to the network entity 200b when the UE 200a is in the ATTEMPTING TO UPDATE state and while the first timer (e.g., "T3246") is running in the case of the CS domain. In another embodiment as defined by the appended claims and their equivalents, the UE 200a sends the detach indication to the network entity 200b when the UE 200a is in the ATTEMPTING TO UPDATE state and while the second timer (e.g., "T3346") is running in case of the PS domain.

At operation 212, after receiving the detach indication, the network entity 200b removes the context information of the UE 200a.

Figure 3:
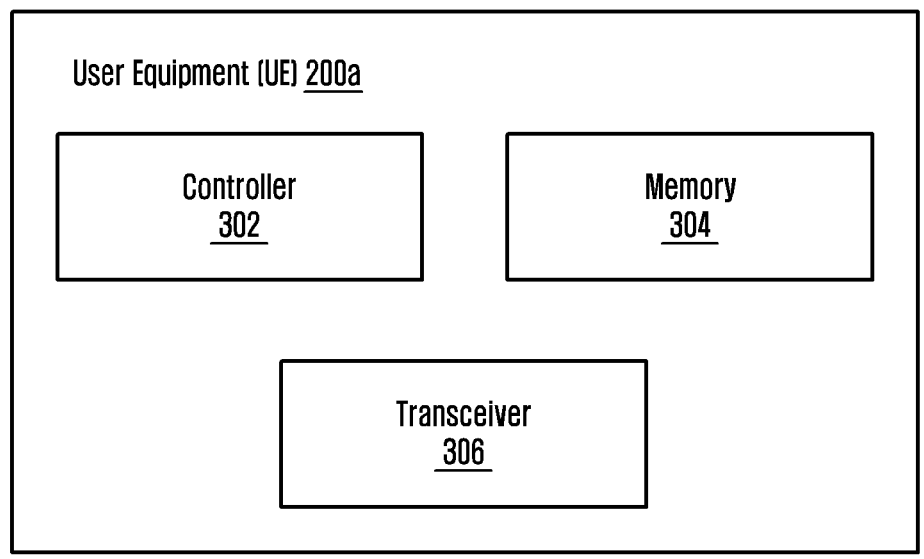
FIG. 3 illustrates various units of a UE for sending a detach indication to a network entity, according to an embodiment of the present disclosure.

FIG. 3 illustrates various units of a UE for sending a detach indication to a network entity, according to an embodiment of the present disclosure.

Referring to FIG. 3, the UE 200a includes a controller 302, a memory 304, and a transceiver 306.

The controller 302 can be configured to detect that the UE 200a is not registered with the network entity 200b, while the UE 200a is in an area previously registered with the network entity 200b. Further, the controller 302 can be configured to send the detach indication to the network entity 200b to detach the service to the UE 200a.

In an embodiment of the present disclosure, that the UE 200a is not registered with the network entity 200b indicates that the UE 200a is in one of an ATTEMPTING TO UPDATE state, a Mobility Management IDLE state, and a LIMITED SERVICE state. In an embodiment of the present disclosure, the detach indication to the network entity 200b is sent when the UE 200a detects at least one of a power off event, a power saving event, an Airplane Mode enablement event, an area update reject message, and an abnormal situation event.

In an embodiment of the present disclosure, the detach indication is an IMSI detach indication. In an embodiment of the present disclosure, the detach indication to the network entity 200b is sent while a Timer is running at the UE 200a in the ATTEMPTING TO UPDATE state. In an example, the UE 200a sends the detach indication to the network entity 200b when the UE 200a is in the ATTEMPTING TO UPDATE state and while the first timer (e.g., "T3246") is running in case of the CS domain. In another example, the UE 200a sends the detach indication to the network entity 200b when the UE 200a is in the ATTEMPTING TO UPDATE state and while the second timer (e.g., "T3346") is running in case of the PS domain.

Further, the controller 302 can be configured to detect that the first timer (e.g., "T3246") is running at the UE 200a and the UE 200a is in one of the ATTEMPTING TO UPDATE state, the Mobility Management IDLE state, and the LIMITED SERVICE state. Further, the controller 302 can be configured to send the detach indication to the network entity 200b to detach the service to the UE 200a.

The memory 304 may include one or more computer-readable storage media. The memory 304 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 304 may, in some examples, be considered a non-transitory storage medium. The term "non-transitory" may indicate that the storage medium is not embodied in a carrier wave or a propagated signal. However, the term "non-transitory" should not be interpreted that the memory 304 is non-movable. In some examples, the memory 304 can be configured to store larger amounts of information than the memory. In certain examples, a non-transitory storage medium may store data that can, over time, change (e.g., in random access memory (RAM) or cache). The transceiver 306 can be configured for communicating internally between the units and externally with the networks.

FIG. 3 shows various units of the UE 200a but it is to be understood that the invention is not limited thereto. In other embodiments of the present disclosure, the UE 200a may include fewer or more units than those illustrated. Further, the labels or names of the units are used only for illustrative purpose and do not limit the scope of the disclosure. Also, one or more units can be combined together to perform same or substantially similar function in the UE 200a.

Figure 4:
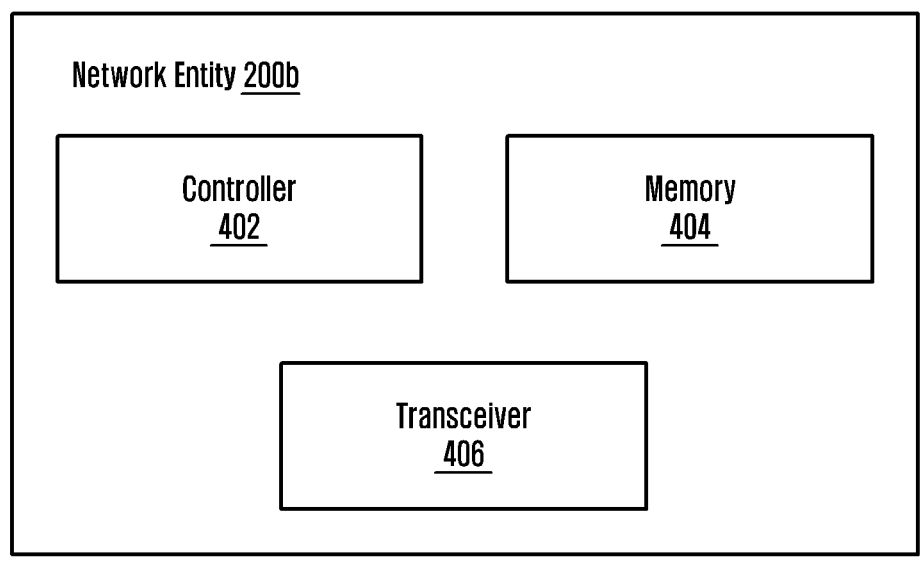
FIG. 4 illustrates various units of a network entity for detaching a service to a UE, according to an embodiment of the present disclosure.

FIG. 4 illustrates various units of a network entity for detaching a UE, according to an embodiment of the present disclosure.

Referring to FIG. 4, the network entity 200b includes a controller 402, a memory 404, and a transceiver 406.

The controller 402 can be configured to maintain context information of the UE 200a in the memory 404. In an embodiment of the present disclosure, the context information can be the area in which the UE 200a is located, temporary identifiers of the UE 200a, or any other temporary information.

Further, the controller 402 can be configured to receive the detach indication from the UE 200a. Further, the controller 402 can be configured to remove the context information to detach the service to the UE 200a. In an embodiment of the present disclosure, the service can be the CS service. In another embodiment of the present disclosure, the service can be the PS service. Unlike the methods and systems of the related art, the proposed mechanism reduces the congestion at the network entity 200b. Further, there is no need to maintain the context information of the UE 200a by the network entity 200b, when the UE 200a is locally detached. Thus, decongesting the congested network entity, especially if the UE 200a receives a MT call or a short messaging service (SMS).

Further, the memory 404 can be configured to store the context information of the UE. The memory 404 may include one or more computer-readable storage media. The memory 404 may include non-volatile storage elements. Examples of such non-volatile storage elements may include magnetic hard discs, optical discs, floppy discs, flash memories, or forms of EPROM or EEPROM memories. In addition, the memory 404 may, in some examples, be considered a non-transitory storage medium. The term "non-transitory" may indicate that the storage medium is not embodied in a carrier wave or a propagated signal. However, the term "non-transitory" should not be interpreted that the memory 404 is non-movable. In some examples, the memory 404 can be configured to store larger amounts of information than the memory. In certain examples, a non-transitory storage medium may store data that can, over time, change (e.g., in RAM or cache). The transceiver 406 can be configured for communicating internally between the units and externally with the networks.

FIG. 4 shows various units of the network entity 200b but it is to be understood that the invention is not limited thereto. In other embodiments of the present disclosure, the network entity 200b may include fewer or more number of units than those illustrated. Further, the labels or names of the units are used only for illustrative purpose and do not limit the scope of the present disclosure. One or more units can be combined together to perform same or substantially similar function in the network entity 200b.

Figure 5:
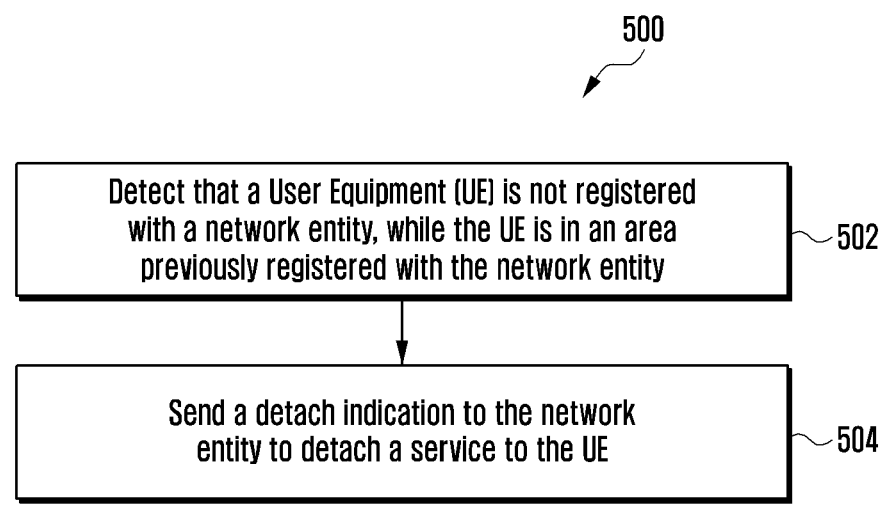
FIG. 5 is a flow diagram illustrating a method for allowing a UE to detach from a network entity, according to an embodiment of the present disclosure.

FIG. 5 is a flow diagram illustrating a method for allowing a UE to detach from a network entity, according to an embodiment as disclosed herein.

Referring to FIG. 5, the method 500 includes detecting that a UE 200a is not registered with a network entity 200b, while the UE 200a is in the area previously registered with the network entity 200b in operation 502. The method 500 allows the controller 302 to detect that the UE 200a is not registered with the network entity 200b, while the UE 200a is in the area previously registered with the network entity 200b.

In an embodiment of the present disclosure, that the UE 200a is not registered with the network entity 200b indicates that the UE 200a is in one of the ATTEMPTING TO UPDATE state, the Mobility Management IDLE state, and the LIMITED SERVICE state.

At operation 504, the method 500 includes sending the detach indication to the network entity 200b to detach the service to the UE 200a. The method 500 allows the controller 302 to send the detach indication to the network entity 200b to detach the service to the UE 200a. In an embodiment of the present disclosure, the detach indication is an IMSI detach indication.

In an embodiment of the present disclosure, the detach indication to the network entity 200b is sent when the UE 200a detects at least one of a power off event, a power saving event, an Airplane Mode enablement event, an area update reject message, and an abnormal situation event.

The various actions, acts, blocks, steps, operations, or the like in the method 500 may be performed in the order presented, in a different order or simultaneously. Further, in some embodiments of the present disclosure, some of the actions, acts, blocks, steps, operations, or the like may be omitted, added, modified, skipped, or the like without departing from the scope of the present disclosure.

Figure 6:
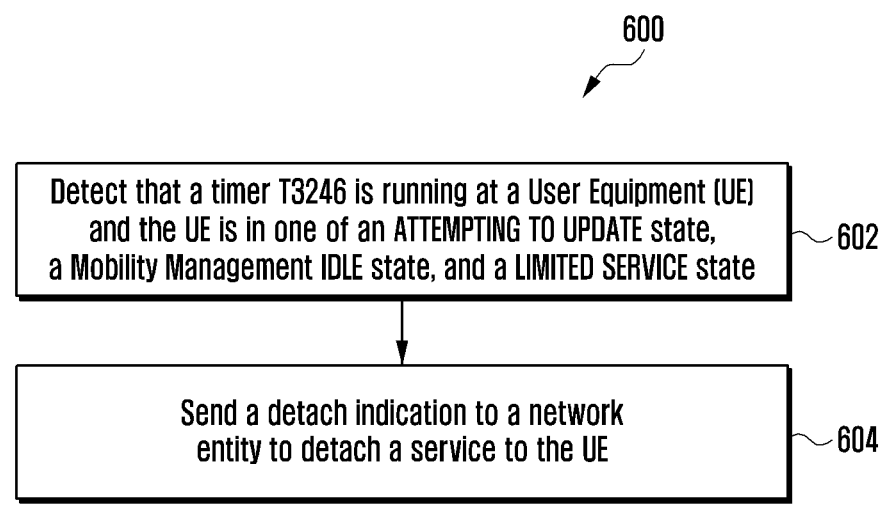
FIG. 6 is a flow diagram illustrating a method for allowing a UE to detach from a network entity, according to an embodiment of the present disclosure.

FIG. 6 is a flow diagram illustrating a method for allowing a UE to detach from a network entity, according to an embodiment of the present disclosure.

Referring to FIG. 6, the method 600 includes detecting that the first timer (e.g., "T3246") is running at the UE 200a and the UE 200a is in one of an ATTEMPTING TO UPDATE state, a Mobility Management IDLE state, and a LIMITED SERVICE state at operation 602. The method 600 allows the controller 302 to detect that the timer "T3246" is running at the UE 200a and the UE 200a is in one of the ATTEMPTING TO UPDATE state, the Mobility Management IDLE state, and the LIMITED SERVICE state.

At operation 604, the method 600 includes sending the detach indication to the network entity 200b to detach the service to the UE 200a. The method 600 allows the controller 302 to send the detach indication to the network entity 200b to detach the service to the UE 200a. In an embodiment of the present disclosure, the detach indication to the network entity 200b is sent while the UE 200a detects at least one of a power off event, a power saving event, an Airplane Mode enablement event, an area update reject message, and an abnormal situation event.

The various actions, acts, blocks, steps, operations, or the like in the method 600 may be performed in the order presented, in a different order or simultaneously. Further, in some embodiments of the present disclosure, some of the actions, acts, blocks, steps, operations, or the like may be omitted, added, modified, skipped, or the like without departing from the scope of the disclosure.

Figure 7:
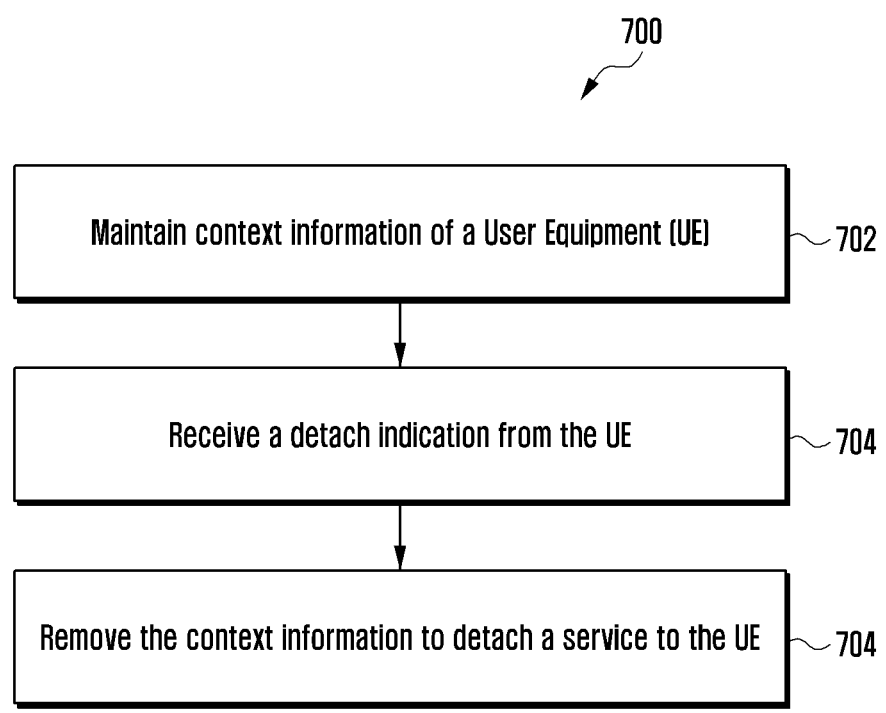
FIG. 7 is a flow diagram illustrating a method for allowing a UE to detach from a network entity, according to an embodiment of the present disclosure.

FIG. 7 is a flow diagram illustrating a method for allowing a UE to detach from a network entity, according to an embodiment of the present disclosure.

Referring to FIG. 7, the method 700 includes maintaining the context information of the UE 200a at operation 702. The method 700 allows the controller 402 to maintain the context information of the UE 200a.

At operation 704, the method 700 includes receiving the detach indication from the UE 200a. The method 700 allows the controller 402 to receive the detach indication from the UE 200a. At operation 706, the method 700 includes removing the context information to detach the service to the UE 200a. The method 700 allows the controller 402 to remove the context information to detach the service to the UE 200a. In an embodiment of the present disclosure, the service can be the CS service. In another embodiment of the present disclosure, the service can be the PS service. Unlike the methods and systems of the related art, the proposed mechanism reduces the congestion at the network entity 200b.

Further, there is no need to maintain the context information of the UE 200a by the network entity 200b, when the UE 200a is locally detached. Thus, decongesting the congested network entity, especially if the UE 200a receives the MT call, the SMS, or the like.

The various actions, acts, blocks, steps, operations, or the like in the method 700 may be performed in the order presented, in a different order or simultaneously. Further, in some embodiments of the present disclosure, some of the actions, acts, blocks, steps, operations, or the like may be omitted, added, modified, skipped, or the like without departing from the scope of the disclosure.

Figure 8:
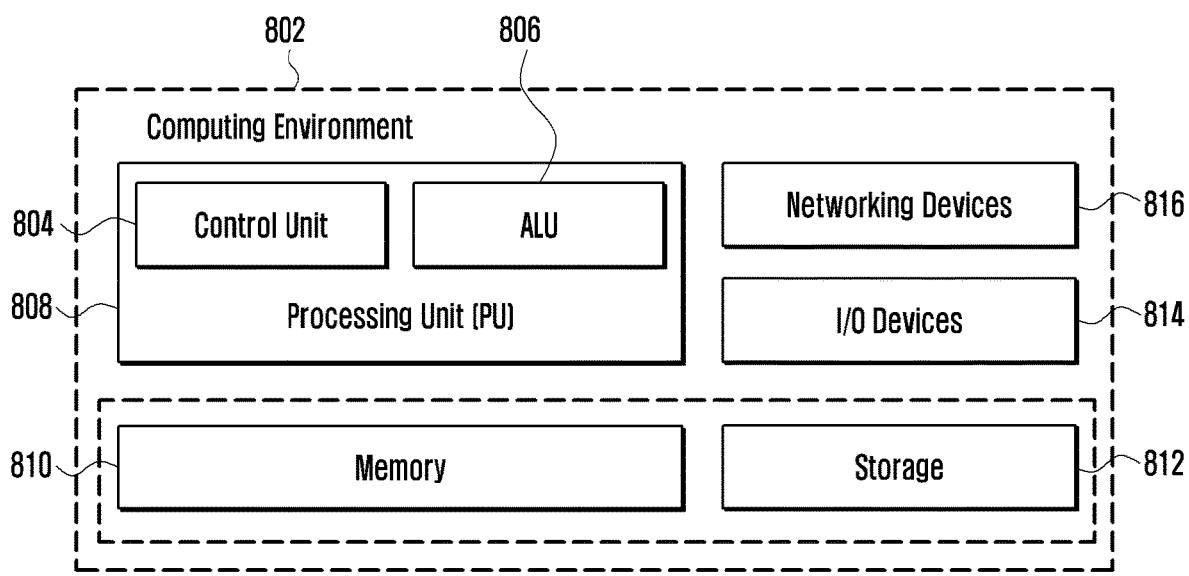
FIG. 8 illustrates a computing environment implementing a method and system for allowing a UE to detach from a network entity, according to various embodiments of the present disclosure.

FIG. 8 illustrates a computing environment implementing a method and system for allowing a UE to detach from a network entity, according to an embodiment of the present disclosure.

Referring to FIG. 8, the computing environment 802 comprises at least one processing unit 808 that is equipped with a control unit 804 and an arithmetic logic unit (ALU) 806, a memory 810, a storage unit 812, plurality of networking devices 816 and a plurality Input output (I/O) devices 814. The processing unit 808 is responsible for processing the instructions of various schemes. The processing unit 808 receives commands from the control unit 804 in order to perform its processing. Further, any logical and arithmetic operations involved in the execution of the instructions are computed with the help of the ALU 806.

The overall computing environment 802 can be composed of multiple homogeneous or heterogeneous cores, multiple CPUs of different kinds, special media and other accelerators. The processing unit 808 is responsible for processing the instructions of the schemes. Further, the plurality of processing units 808 may be located on a single chip or over multiple chips.

The various schemes are comprised of instructions and codes required for their implementation and which are stored in either the memory 810 or the storage unit 812 or both. At the time of execution, the instructions may be fetched from the corresponding memory 810 or storage unit 812, and executed by the processing unit 808.

In case of any hardware implementations various networking devices 816 or external I/O devices 814 may be connected to the computing environment to support the implementation through the networking unit and the I/O device unit.

The embodiments disclosed herein can be implemented through at least one software program running on at least one hardware device and performing network management functions to control the elements. The elements shown in FIGS. 2 through 8 include blocks which can be at least one of a hardware device, or a combination of hardware device and software units.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a user equipment (UE), the method comprising:
   transmitting, to a network entity, an area update request message;
   receiving, from the network entity, an area update reject message including information associated with congestion of the network entity; and
   performing, in case that the UE is in an ATTEMPTING TO UPDATE state in response to the area update reject message including the information, a detach based on a T3246 timer running and a location area of a current cell being same as a stored location area.

2. The method of claim 1,
   wherein performing the detach comprises transmitting a detach indication to the network entity, the detach indication including an international mobile subscriber identity detach indication, and
   wherein the detach indication is used to remove UE context information.

3. The method of claim 2, wherein the UE context information is removed to detach a service to the UE in case that the detach indication is transmitted to the network entity.

4. The method of claim 1, wherein the area update request message includes a location area update request message.

5. A user equipment (UE) for detaching from a network entity, the UE comprising:
   a transceiver; and
   at least one processor configured to control the transceiver to:
      transmit, to a network entity, an area update request message,
      receive, from the network entity, an area update reject message including information associated with congestion of the network entity, and
      perform, in case that the UE is in an ATTEMPTING TO UPDATE state in response to the area update reject message including the information, a detach based on a T3246 timer running and a location area of a current cell being same as a stored location area.

6. The UE of claim 5,
   wherein the at least one processor is configured to transmit a detach indication to the network entity, the detach indication including an international mobile subscriber identity detach indication, and
   wherein the detach indication is used to remove UE context information.

7. The UE of claim 5, wherein the area update request message includes a location area update request message.

8. The UE of claim 6, wherein the UE context information is removed to detach a service to the UE in case that the detach indication is transmitted to the network entity.

9. A network entity, the network entity comprising:
   a transceiver; and
   at least one processor configured to control the transceiver to:
      receive, from a user equipment (UE), an area update request message,
      transmit, to the UE, an area update reject message including information associated with congestion of the network entity, and
      receive, in case that the UE is in an ATTEMPTING TO UPDATE state in response to the area update reject message including the information, a detach indication based on a T3246 timer running and a location area of a current cell being same as a stored location area.

10. The network entity of claim 9,
   wherein the detach indication comprises an international mobile subscriber identity detach indication, and
   wherein the detach indication is used to remove UE context information.

11. The network entity of claim 9, wherein the area update request message includes a location area update request message.

12. A method by a network entity, the method comprising:
receiving, from a user equipment (UE), an area update request message;
transmitting, to the UE, an area update reject message including information associated with congestion of the network entity; and
receiving, in case that the UE is in an ATTEMPTING TO UPDATE state in response to the area update reject message including the information, a detach indication based on a T3246 timer running and a location area of a current cell being same as a stored location area.

13. The method of claim 12, wherein the detach indication includes an international mobile subscriber identity detach indication.

14. The method of claim 12, wherein the detach indication is used to remove UE context information.

15. The method of claim 12, wherein the area update request message includes a location area update request message.

\* \* \* \* \*